United States Patent
Kaigawa et al.

(10) Patent No.: US 6,915,681 B2
(45) Date of Patent: Jul. 12, 2005

(54) GEAR-SHIFT CONTROL DEVICE AND GEAR-SHIFT CONTROL METHOD FOR AUTOMATIC TRANSMISSION

(75) Inventors: Masato Kaigawa, Toyota (JP); Yasushi Kobiki, Toyota (JP); Noritaka Takebayashi, Toyota (JP); Masahiko Ando, Anjo (JP); Takeshi Gotou, Anjo (JP)

(73) Assignees: Toyota Jidosha Kabushiki Kaisha, Toyota (JP); Aisin AW Co., LTD, Anjo (JP)

( * ) Notice: Subject to any disclaimer, the term of this patent is extended or adjusted under 35 U.S.C. 154(b) by 13 days.

(21) Appl. No.: 10/397,527

(22) Filed: Mar. 27, 2003

(65) Prior Publication Data

US 2003/0213296 A1 Nov. 20, 2003

(30) Foreign Application Priority Data

Mar. 28, 2002 (JP) ........................... 2002-091044

(51) Int. Cl.[7] ........................................... G01M 13/02
(52) U.S. Cl. ..................................... 73/118.1
(58) Field of Search ................ 73/112, 116, 117.2, 73/117.3, 118.1, 119 R; 374/141, 144

(56) References Cited

U.S. PATENT DOCUMENTS

| 4,604,700 | A | * | 8/1986 | Igarashi et al. ............ 701/64 |
| 5,069,084 | A | * | 12/1991 | Matsuno et al. ............ 477/61 |
| 5,593,364 | A | * | 1/1997 | Ishii et al. ............ 477/98 |
| 5,777,211 | A | * | 7/1998 | Binienda et al. ............ 73/53.05 |
| 5,865,702 | A | * | 2/1999 | Yokoyama et al. ............ 475/117 |
| 5,947,856 | A | * | 9/1999 | Tabata et al. ............ 475/128 |
| 6,024,668 | A | * | 2/2000 | Holbrook et al. ............ 477/98 |
| 6,155,948 | A | * | 12/2000 | Gierer ............ 475/123 |
| 6,454,678 | B1 | * | 9/2002 | Lee ............ 477/141 |
| 6,637,565 | B2 | * | 10/2003 | Kwon ............ 192/3.29 |
| 6,729,987 | B2 | * | 5/2004 | Sakamoto et al. ............ 475/117 |
| 2002/0098945 | A1 | * | 7/2002 | Kwon ............ 477/174 |
| 2003/0040388 | A1 | * | 2/2003 | Sakamoto et al. ............ 475/117 |

FOREIGN PATENT DOCUMENTS

| JP | 64-35153 | 2/1989 |
| JP | 2-97761 | 4/1990 |
| JP | 64-35154 | 2/1998 |

* cited by examiner

Primary Examiner—Eric S. McCall
(74) Attorney, Agent, or Firm—Oblon, Spivak, McClelland, Maier & Neustadt, P.C.

(57) ABSTRACT

An ECT-ECU includes a circuit that calculates an oil temperature threshold on the basis of a signal input from one of an engine coolant temperature sensor, an engine intake air temperature sensor, and an AT hydraulic fluid temperature sensor if a signal for starting an engine of a vehicle is input thereto from an ignition switch, a circuit that detects an oil temperature on the basis of a signal input from the AT hydraulic fluid temperature sensor at intervals of a predetermined sampling time while the vehicle is running, and a circuit that controls an automatic transmission to prohibit a gear shift from fourth speed to fifth speed if a detected oil temperature is lower than the oil temperature threshold.

8 Claims, 10 Drawing Sheets

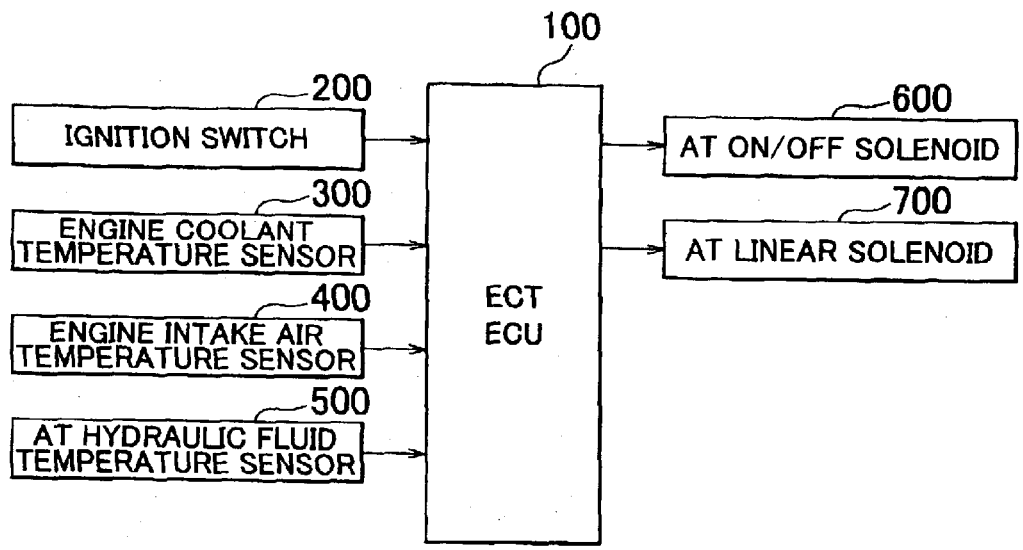
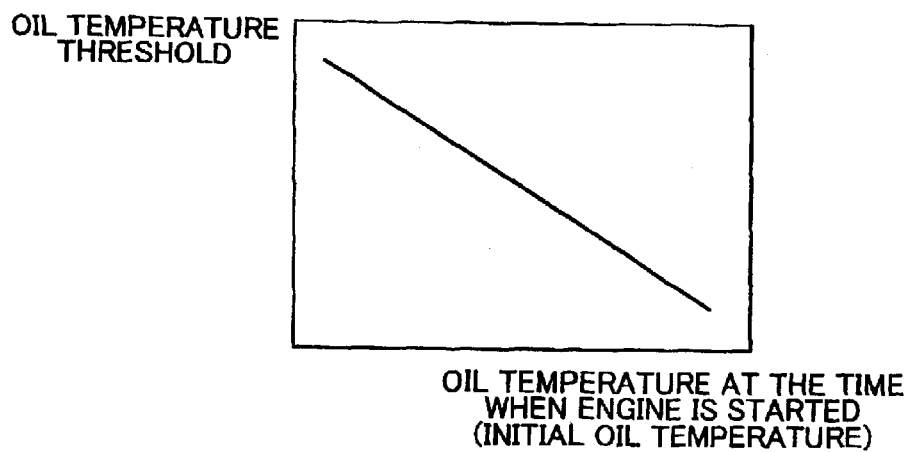

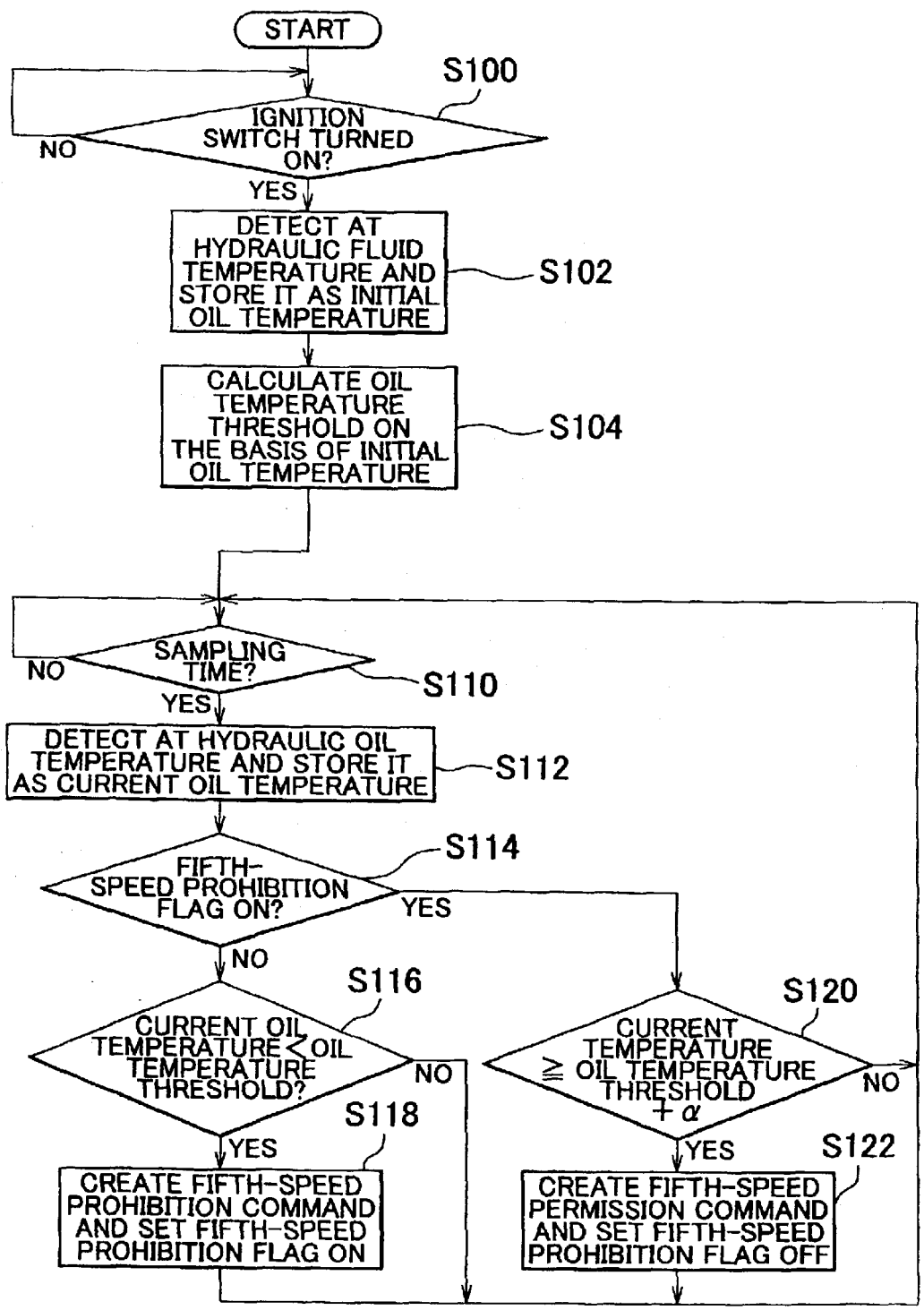

OIL TEMPERATURE THRESHOLD

ENGINE INTAKE AIR TEMPERATURE AT THE TIME WHEN ENGINE IS STARTED (INITIAL INTAKE AIR TEMPERATURE)

GEAR-SHIFT CONTROL DEVICE AND GEAR-SHIFT CONTROL METHOD FOR AUTOMATIC TRANSMISSION

INCORPORATION BY REFERENCE

The disclosures of Japanese Patent Application No. 2002-091044 filed on Mar. 28, 2002 including the specification, drawings, and abstract is incorporated herein by reference in its entirety.

BACKGROUND OF THE INVENTION

1. Field of the Invention

The invention relates to a control device for a vehicular automatic transmission and, more particularly, to a device for controlling an automatic transmission on the basis of a temperature of hydraulic fluid contained therein.

2. Description of the Related Art

As an automatic transmission to be installed in a vehicle, there has generally been employed a transmission that is constructed by combining a torque converter composed of a pump, a turbine, a stator, and the like with a multistage-type gear-shift mechanism connected to the turbine of the torque converter. This automatic transmission is usually equipped with a hydraulic circuit portion and a hydraulic control device as a main component. The hydraulic control device couples and releases hydraulically operated frictional coupling elements in the gear-shift mechanism such as clutches and brakes whereby a gear-shift operation of the automatic transmission is performed. In an automatic transmission equipped with such a hydraulic control device, when a gear-shift operation thereof is performed, hydraulic fluid pressure is supplied to a hydraulic circuit portion for operating frictional coupling elements. For establishing the hydraulic fluid pressure, an open period, an opening, or the like of a hydraulic control valve included in the hydraulic circuit portion is changed in accordance with a pulse duty factor or the like of a drive pulse signal supplied from a control unit to the hydraulic control valve. The hydraulic fluid pressure is thereby controlled. If the frictional coupling elements abruptly shift from a released state to a coupled state during control, a gear-shift shock may be caused. Accordingly, the hydraulic pressure supplied to the frictional coupling elements is regulated whereby the frictional coupling elements shift from a released state to a half-coupled state and then to a coupled state. In this manner, the frictional coupling elements can be shifted from an engaged state to a coupled state without causing a gear-shift shock.

As described above, in the case where the hydraulic fluid pressure supplied to the frictional coupling elements is changed in accordance with a predetermined characteristic, if the hydraulic fluid is at a low temperature, the viscosity thereof is higher in comparison with the case where the hydraulic fluid is at a high temperature, and a gear-shift operation in the automatic transmission undergoes a decline in responsiveness. Hence, although the frictional coupling elements are coupled at a suitable timing when hydraulic fluid is at a relatively high temperature, hydraulic fluid is supplied to or discharged from the frictional coupling elements with delay if the hydraulic fluid reaches a relatively low temperature. For this reason, there are some cases where the frictional coupling elements cannot be released or coupled at a suitable timing. As a result, a gear-shift shock may be caused.

Japanese Patent Application Laid-Open No. 64-35154 discloses a hydraulic control device for an automatic transmission as a solution to such a problem. The control device disclosed in this publication includes frictional engagement elements, a hydraulic control circuit, an oil temperature detecting circuit, and a control characteristic changing circuit. The frictional engagement elements are hydraulically operated and are designed to perform a gear-shift operation in the automatic transmission. To cause the frictional engagement elements to perform the gear-shift operation, the hydraulic control circuit supplies hydraulic fluid in accordance with a predetermined control characteristic. The oil temperature detecting circuit detects a hydraulic fluid temperature that generates a hydraulic fluid pressure. The control characteristic changing circuit causes the hydraulic control circuit to change a control characteristic during control of the supply of hydraulic fluid pressure to the frictional engagement elements in accordance with a hydraulic fluid temperature detected by the oil temperature detecting circuit.

According to this control device, the hydraulic fluid pressure supplied to the frictional engagement elements is changed on the basis of a control characteristic corresponding to the temperature of the hydraulic fluid contained in the automatic transmission Hence, the frictional engagement elements are operated without delay, for example, when hydraulic fluid is at a low temperature, and timings for engaging the frictional engagement elements and the like are suitably controlled.

A sensor for detecting a temperature of the hydraulic fluid contained in an automatic transmission is usually installed close to an exit of a torque converter that generates a large amount of heat and that tends to be a high-temperature area, for example, due to restrictions imposed on locations where the sensor can be installed. Hence, the sensor does not directly measure a hydraulic fluid temperature in the vicinity of an actuator or a valve that actually performs gear-shift control. Furthermore, since the hydraulic circuit of the automatic transmission is structurally complicated, the hydraulic fluid temperature varies widely with location. Thus, there are some cases where an oil temperature detected by the sensor is greatly different from a hydraulic fluid temperature in the vicinity of the actuator or the valve that actually performs gear-shift control. Especially in a low-temperature area, the hydraulic circuit itself has cooled. Therefore, hydraulic fluid is cooled while circulating through the hydraulic circuit or hydraulic fluid that has cooled continues to stay where it is. As a result, oil temperatures in the vicinity of the actuator and the valve as operating regions become lower than the oil temperature detected by the sensor.

If the control device disclosed in the abovementioned publication is applied under such a circumstance, gear-shift control cannot be performed on the basis of oil temperatures in actual operating regions. Therefore, a gear-shift shock may be caused.

If hydraulic fluid contained in the automatic transmission is at a low temperature, the viscosity thereof rises. Thus, a deterioration in responsiveness based on a clutch-to-clutch operation using a direct pressure is caused. Hence, as a solution different from the one disclosed in the above-mentioned publication, there is a control device that performs control in such a manner as to prohibit a gear shift to a specific gear stage if the hydraulic fluid temperature falls below a predetermined threshold. In such a control device as well, since prohibition of a gear shift cannot be controlled on the basis of an oil temperature in an actual operating region, the following problem is caused. Even if a measured oil temperature is high and hydraulic fluid in the operating region is at a low temperature, the threshold needs to be set high in advance in order to prohibit a gear shift to a specific gear stage. In the case where the threshold is thus set, if a difference between the measured oil temperature and the oil temperature in the operating region is small. nullification of prohibition of the gear shift is retarded and a gear shift to a higher gear stage is made with delay. As a result, driveability and fuel consumption are adversely affected.

SUMMARY OF THE INVENTION

The invention has been made in response to the problems mentioned above. It is an object of the invention to provide a gear-shift control device and a gear-shift control method for controlling a gear shift in an automatic transmission installed in a vehicle on the basis of a temperature of hydraulic fluid contained in the automatic transmission without the necessity to mount a large number of oil temperature sensors in coordination with the construction of a hydraulic circuit of the automatic transmission.

In order to achieve the above-mentioned object, a control device for an automatic transmission installed in a vehicle as one aspect of the invention comprises a detecting portion that detects a timing when an engine of the vehicle is to be started, an oil temperature detecting portion that detects a temperature of hydraulic fluid contained in the automatic transmission, a storing portion that stores an oil temperature threshold corresponding to the hydraulic fluid temperature at the time when the engine is started, a calculating portion that calculates an oil temperature threshold on the basis of an oil temperature detected by the oil temperature detecting portion at a timing detected by the detecting portion, and a control portion that controls the automatic transmission in such a manner as to prohibit a gear shift to a specific gear stage if the oil temperature detected by the oil temperature detecting portion is equal to or lower than the oil temperature threshold calculated by the calculating portion while the vehicle is running.

A control method corresponding to the control device is designed to control an automatic transmission installed in a vehicle. This control method comprises a detecting step for detecting a timing when an engine of the vehicle is to be started, an oil temperature detecting step for detecting a temperature of hydraulic fluid contained in the automatic transmission, a preparing step for preparing in advance an oil temperature threshold corresponding to the hydraulic fluid temperature at the time when the engine is started, a calculating step for calculating an oil temperature threshold on the basis of an oil temperature detected in the oil temperature detecting step at a timing detected in the detecting step, and a control step for controlling the automatic transmission in such a manner as to prohibit a gear shift to a specific gear stage if the oil temperature detected in the oil temperature detecting step is equal to or lower than the oil temperature threshold calculated in the calculating step while the vehicle is running.

A control device as another aspect of the invention controls an automatic transmission installed in a vehicle. This control device comprises a detecting portion that detects a timing when an engine of the vehicle is to be started, an oil temperature detecting portion that detects a temperature of hydraulic fluid contained in the automatic transmission, a coolant temperature detecting portion for detecting a coolant temperature for the engine, a storing portion that stores an oil temperature threshold corresponding to the hydraulic fluid temperature at the time when the engine is started, a calculating portion that calculates an oil temperature threshold on the basis of a coolant temperature detected by the coolant temperature detecting portion at a timing detected by the detecting portion, and a control portion that controls the automatic transmission in such a manner as to prohibit a gear shift to a specific gear stage if the oil temperature detected by the oil temperature detecting portion is equal to or lower than the oil temperature threshold calculated by the calculating portion while the vehicle is running.

A control method corresponding to the control device comprises a detecting step for detecting a timing when an engine of the vehicle is to be started, an oil temperature detecting step for detecting a temperature of the hydraulic fluid contained in the automatic transmission, a coolant temperature detecting step for detecting a coolant temperature for the engine, a preparing step for preparing in advance an oil temperature threshold corresponding to the temperature of coolant at the time when the engine is started, a calculating step for calculating an oil temperature threshold on the basis of a coolant temperature detected in the coolant temperature detecting step at a timing detected in the detecting step, and a control step for controlling the automatic transmission in such a manner as to prohibit a gear shift to a specific gear stage if the oil temperature detected in the oil temperature detecting step is equal to or lower than the oil temperature threshold calculated in the calculating step while the vehicle is running.

A control device as another aspect of the invention comprises a detecting portion for detecting a timing when an engine of the vehicle is to be started, an oil temperature detecting portion for detecting a temperature of hydraulic fluid contained in the automatic transmission, an intake air temperature detecting portion for detecting a temperature of intake air introduced into the engine, a storing portion for storing an oil temperature threshold corresponding to the temperature of intake air at the time when the engine is started, a calculating portion that calculates an oil temperature threshold on the basis of the intake air temperature detected by the intake air temperature detecting portion at a timing detected by the detecting portion, and a control portion for controlling the automatic transmission in such a manner as to prohibit a gear shift to a specific gear stage if the oil temperature detected by the oil temperature detecting portion is equal to or lower than the oil temperature threshold calculated by the calculating portion while the vehicle is running.

A control method corresponding to the control device comprises a detecting step for detecting a timing when an engine of the vehicle is to be started, an oil temperature detecting step for detecting a temperature of hydraulic fluid contained in the automatic transmission, an intake air temperature detecting step for detecting a temperature of intake air introduced into the engine, a preparing step for preparing in advance an oil temperature threshold corresponding to the temperature of intake air at the time when the engine is started, a calculating step for calculating an oil temperature threshold on the basis of the intake air temperature detected in the coolant temperature detecting step at a timing detected in the detecting step, and a control step for controlling the automatic transmission in such a manner as to prohibit a gear shift to a specific gear stage if the oil temperature detected in the oil temperature detecting step is equal to or lower than the oil temperature threshold calculated in the calculating step while the vehicle is running.

A control device as another aspect of the invention comprises a detecting portion for detecting a first timing when an engine of the vehicle is stopped and a second timing which follows the first timing and at which the engine of the vehicle is started next time, an oil temperature detecting portion for detecting a temperature of hydraulic fluid contained in the automatic transmission, a measuring portion that measures a time that elapses from the first timing to the second timing, a storing portion for storing an oil temperature threshold corresponding to the time, a calculating portion that calculates an oil temperature threshold on the basis of a time measured by the measuring portion at the second timing detected by the detecting portion, and a control portion for controlling the automatic transmission in such a manner as to prohibit a gear shift to a specific gear stage if the oil temperature detected by the oil temperature detecting portion is equal to or lower than the oil temperature threshold calculated by the calculating portion while the vehicle is running.

A control method corresponding to the control device comprises a detecting step for detecting a first timing when an engine of the vehicle is stopped and a second timing which follows the first timing and at which the engine of the vehicle is started next time, an oil temperature detecting step for detecting a temperature of hydraulic fluid contained in the automatic transmission, a measuring step for measuring a time that elapses from the first timing to the second timing, a preparing step for preparing in advance an oil temperature threshold corresponding to the elapsed time, a calculating step for calculating an oil temperature threshold on the basis of a time measured in the measuring step at a second timing detected in the detecting step, and a control step for controlling the automatic transmission in such a manner as to prohibit a gear shift to a specific gear stage if the oil temperature detected in the oil temperature detecting step is equal to or lower than the oil temperature threshold calculated in the calculating step while the vehicle is running.

A control device as another aspect of the invention comprises a detecting portion for detecting a timing when an engine of the vehicle is to be started, an oil temperature detecting portion for detecting a temperature of hydraulic fluid contained in the automatic transmission, a coolant temperature detecting portion for detecting a coolant temperature for the engine, an intake air temperature detecting portion for detecting a temperature of intake air introduced into the engine, a storing portion for storing an oil temperature threshold corresponding to the hydraulic fluid temperature at the time when the engine is started, an oil temperature threshold corresponding to the temperature of coolant at the time when the engine is started, and an oil temperature threshold corresponding to the temperature of intake air at the time when the engine is started, a calculating portion that calculates an oil temperature threshold on the basis of one of an oil temperature detected by the oil temperature detecting portion, a coolant temperature detected by the coolant temperature detecting portion, and the intake air temperature detected by the intake air temperature detecting portion at a timing detected by the detecting portion, and a control portion for controlling the automatic transmission in such a manner as to prohibit a gear shift to a specific gear stage if the oil temperature detected by the oil temperature detecting portion is equal to or lower than the oil temperature threshold calculated by the calculating portion while the vehicle is running.

A control method as another aspect of the invention comprises a detecting step for detecting a timing when an engine of the vehicle is to be started, an oil temperature detecting step for detecting a temperature of hydraulic fluid contained in the automatic transmission, a coolant temperature detecting step for detecting a coolant temperature for the engine, an intake air temperature detecting step for detecting a temperature of intake air introduced into the engine, a preparing step for preparing in advance an oil temperature threshold corresponding to the hydraulic fluid temperature at the time when the engine is started, an oil temperature threshold corresponding to the temperature of coolant at the time when the engine is started, and an oil temperature threshold corresponding to the temperature of intake air at the time when the engine is started, a calculating step for calculating an oil temperature threshold on the basis of one of an oil temperature detected in the oil temperature detecting step, a coolant temperature detected in the coolant temperature detecting step, and an intake air temperature detected in the intake air temperature detecting step at a timing detected in the detecting step, and a control step for controlling the automatic transmission in such a manner as to prohibit a gear shift to a specific gear stage if the oil temperature detected in the oil temperature detecting step is equal to or lower than the oil temperature threshold calculated in the calculating step while the vehicle is running.

BRIEF DESCRIPTION OF THE DRAWINGS

FIG. 1 is a control block diagram of a system including an ECT-ECU that realizes a control device for an automatic transmission in accordance with embodiments of the invention.

FIG. 2 shows a relationship that is stored in a memory of an ECT-ECU in accordance with the first embodiment of the invention and that indicates how the oil temperature threshold is related to the initial oil temperature.

FIG. 3 is a flowchart showing a control structure of a program that is executed by the ECT-ECU in accordance with the first embodiment of the invention.

DETAILED DESCRIPTION OF PREFERRED EMBODIMENTS

Figure 4:
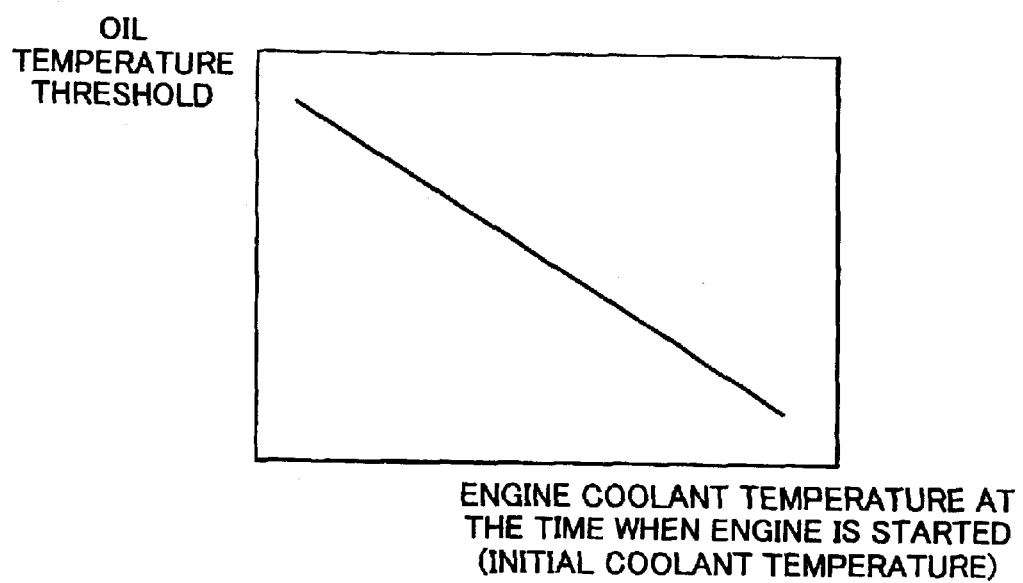
FIG. 4 shows a relationship that is stored in a memory of an ECT-ECU in accordance with the second embodiment of the invention and that indicates how the oil temperature threshold is related to the initial coolant temperature.

Hereinafter, the embodiments of the invention will be described with reference to the drawings. In the following description, like parts are denoted by like reference symbols and are identical in name and function as well. Therefore, repetition of detailed description of those parts will be avoided.

[First Embodiment]

FIG. 1 is a control block diagram of an automatic gear-shift system including an ECT-ECU (Electronically Controlled Automatic Transmission—Electronic Control Unit) 100 that realizes a control device for an automatic transmission in accordance with the first embodiment. As shown in FIG. 1, the ECT-ECU 100 of this system is a controller for controlling the automatic transmission. The ECT-ECU 100 includes a memory that stores programs and various data, a CPU (Central Processing Unit) that executes the programs stored in the memory, a clock that generates a fundamental motion frequency, and the like. The ECT-ECU 100 corresponds to a calculating portion as calculating means, a storing portion as storing means, a control portion as control means, and a measuring portion as measuring means.

Input signal lines extending from an ignition switch 200, an engine coolant temperature sensor 300, an engine intake air temperature sensor 400, and an AT hydraulic fluid temperature sensor 500 are connected to the ECT-ECU 100. The ignition switch 200 corresponds to a detecting portion as detecting means for detecting a timing when an engine is to be started. The engine coolant temperature sensor 300 corresponds to a coolant temperature detecting portion as coolant temperature detecting means for detecting a coolant temperature for the engine. The engine intake air temperature sensor 400 corresponds to an intake air temperature detecting portion as intake air temperature detecting means for detecting a temperature of intake air introduced into the engine. The AT hydraulic fluid temperature sensor 500 corresponds to an oil temperature detecting portion as oil temperature detecting means for detecting a temperature of hydraulic fluid contained in the automatic transmission. Output signal lines extending from the ECT-ECU 100 are connected to an AT on-off solenoid 600 and an AT linear solenoid 700.

The ECT-ECU 100 in accordance with the first embodiment detects start of the engine on the basis of a signal input from the ignition switch 200. Then, the ECT-ECU 100 detects an oil temperature of the automatic transmission at the time when the engine is started and stores it in the memory as an initial oil temperature. The ECT-ECU 100 calculates an oil temperature threshold on the basis of the initial oil temperature and a relationship that is stored in the memory and that is established between initial oil temperature and oil temperature threshold. As shown in FIG. 2, according to the relationship that is stored in the memory and that indicates how the oil temperature threshold is related to the initial oil temperature, the oil temperature threshold rises in proportion to a fall in the initial oil temperature and falls in proportion to a rise in the initial oil temperature. Although the initial oil temperature and the oil temperature threshold establish a linear relationship in FIG. 2, other relationships are possible as well.

If a vehicle starts running after calculation of the oil temperature threshold, the ECT-ECU 100 detects a temperature of hydraulic fluid contained in the automatic transmission on the basis of a signal input from the AT hydraulic fluid temperature sensor 500. In the first embodiment, if the detected oil temperature is lower than the oil temperature threshold, a gear shift from fourth speed to fifth speed in the automatic transmission is prohibited. If the detected oil temperature becomes equal to or higher than (the oil temperature threshold +α), prohibition of the gear shift from fourth speed to fifth speed is nullified. It is to be noted herein that the automatic transmission of the first embodiment is realized as a five-speed automatic transmission in which a gear shift from fourth speed to fifth speed is made by a clutch-to-clutch operation based on a direct pressure. During this gear shift, if a deterioration in responsiveness is caused due to a low temperature of hydraulic fluid contained in the automatic transmission, a significant gear-shift shock tends to occur.

In the case where a gear shift to fifth speed is prohibited, the ECT-ECU 100 creates a fifth speed prohibition command and sets a fifth-speed prohibition flag to "on". Even if other fifth-speed gear-shift conditions are satisfied, the ECT-ECU 100 does not output a fifth-speed gear-shift indication signal to the AT on/off solenoid 600 or the AT linear solenoid 700 as long as the fifth-speed prohibition command has been created.

A control structure of a program that is executed by the ECT-ECU 100 in accordance with the first embodiment will be described with reference to FIG. 3.

In step (hereinafter simplified as "S") 100, the ECT-ECU 100 determines whether or not the ignition switch has been turned on. This determination is made on the basis of an input signal that is input from the ignition switch 200 to the ECT-ECU 100. If the ignition switch has been turned on (YES in S100), the operation is shifted to S102. If the ignition switch has not been turned on (NO in S100), the operation is returned to S100.

In S102, the ECT-ECU 100 detects an AT hydraulic fluid temperature on the basis of a signal input from the AT hydraulic fluid temperature sensor 500 and stores it in the memory as an initial oil temperature. In S104, the ECT-ECU 100 calculates an oil temperature threshold on the basis of the stored initial oil temperature. At this moment, the oil temperature threshold is calculated on the basis of the detected initial oil temperature and a relationship that is stored in the memory and that indicates how the oil temperature threshold is related to the initial oil temperature (FIG. 2).

In S110, the ECT-ECU 100 determines whether or not a sampling time has been reached. This determination is made on the basis of an output signal from the clock that is built into the ECT-ECU 100. If the sampling time has been reached (YES in S110), the operation is shifted to S112. If the sampling time has not been reached (NO in S110), the operation is returned to S110.

In S112, the ECT-ECU 100 detects an AT hydraulic fluid temperature on the basis of a signal input from the AT hydraulic fluid temperature sensor 500 and stores it in the memory as a current oil temperature. In S114, the ECT-ECU 100 determines whether or not the fifth-speed prohibition flag has been set to "on". If the fifth-speed prohibition flag has been set to "on " (YES in S114), the operation is shifted to S120. If the fifth-speed prohibition flag has not been set to "on" (NO in S114), the operation is shifted to S116.

In S116, the ECT-ECU 100 determines whether or not the current oil temperature stored in the memory is lower than the oil temperature threshold. If the current oil temperature is lower than the oil temperature threshold (YES in S116), the operation is shifted to S118. If the current oil temperature is not lower than the oil temperature threshold (NO in S116), the operation is returned to S110.

In S118, the ECT-ECU 100 creates a fifth-speed prohibition command and sets the fifth-speed prohibition flag to "on". The operation is thereafter returned to S110.

In S120, the ECT-ECU 100 determines whether or not the current oil temperature stored in the memory is equal to or higher than (the oil temperature threshold +α). It is to be noted herein that a is a positive constant. If the current oil temperature is equal to or higher than (the oil temperature threshold +α) (YES-in S120), the operation is shifted to S122. If the current oil temperature is lower than (the oil temperature threshold +α) (NO in S120), the operation is returned to S110.

In S122, the ECT-ECU 100 creates a fifth-speed permission command and sets the fifth-speed prohibition flag off. The operation is thereafter returned to S110.

Operation of the ECT-ECU 100 that is based on the structure and the flowchart as mentioned above and that realizes the control device for the automatic transmission in accordance with the first embodiment will be described.

If a user of the vehicle turns the ignition switch on (YES in S100), the ECT-ECU 100 detects an AT hydraulic fluid temperature on the basis of a signal input from the AT hydraulic fluid temperature sensor 500 and stores it in the memory as an initial oil temperature (S102). An oil temperature threshold is calculated on the basis of the detected initial oil temperature and the relationship indicating how the oil temperature threshold is related to the initial oil temperature (S104).

If the sampling time has been reached after takeoff of the vehicle (YES in S110), the ECT-ECU 100 detects an AT hydraulic fluid temperature on the basis of a signal input from the AT hydraulic fluid temperature sensor 500 and stores it in the memory as a current oil temperature (S112). If the fifth-speed flag is not on (No in S114) and if the current oil temperature is lower than the oil temperature threshold that has been calculated on the basis of the initial oil temperature (YES in S116), a fifth-speed prohibition command is created and the fifth-speed prohibition flag is set to "on" (S118).

If the temperature of hydraulic fluid contained in the automatic transmission rises because the vehicle has continuously run, the fifth-speed prohibition flag is on (YES in S114). In this state, if the current oil temperature becomes equal to or higher than (the oil temperature threshold +α) (YES in S120), a fifth-speed permission command is created and the fifth-speed prohibition flag is set to "off" (S122).

Thus, according to the control device for the automatic transmission in accordance with the first embodiment, an oil temperature threshold is calculated on the basis of a temperature of hydraulic fluid contained in the automatic transmission at the time when the engine is started, and fifth-speed prohibition control is performed on the basis of the oil temperature threshold.

In the case where the operation as described above is performed, the oil temperature threshold is a threshold that has been calculated on the basis of an initial oil temperature at the time when the engine is started. As shown in FIG. 2, the threshold is set such that the oil temperature threshold rises in proportion to a fall in the oil temperature (initial oil temperature) at the time when the engine is started and the oil temperature threshold falls in proportion to a rise in initial oil temperature. If the hydraulic fluid contained in the automatic transmission is determined to be at a low temperature as a result of the detection carried out during the start of the engine, the automatic transmission itself and hydraulic fluid contained therein have cooled. Thus, even if the oil temperature detected by the AT hydraulic fluid temperature sensor 500 is high, it is quite likely that a temperature in the vicinity of a clutch for making a gear shift from fourth speed to fifth speed should not have risen sufficiently. Therefore, the oil temperature threshold for prohibiting a gear shift to fifth speed is set high. On the other hand, if hydraulic fluid contained in the automatic transmission is determined to be at a high temperature as a result of the detection carried out during the start of the engine, the automatic transmission itself and hydraulic fluid contained therein have been warmed. Thus, even if the oil temperature detected by the AT hydraulic fluid temperature sensor 500 is more or less low, it is quite likely that a temperature in the vicinity of the clutch for making a gear shift from fourth speed to fifth speed should have risen. Therefore, the oil temperature threshold for prohibiting a gear shift to fifth speed is set low.

As described above, according to the control device for the automatic transmission in accordance with the first embodiment, a gear shift from fourth speed to fifth speed in the automatic transmission is made by a clutch-to-clutch operation using direct pressure. Thus, if hydraulic fluid in the vicinity of the clutch is at a low temperature, an undesirable lack of responsiveness is obtained and a gearshift shock is caused. The oil temperature detecting portion as the oil temperature detecting means is installed, for example, at a position that is close to a torque converter of the automatic transmission and that is different from regions in the vicinity of the clutch. If hydraulic fluid contained in the automatic transmission is determined to be at a low temperature as a result of the detection carried out by the oil temperature detecting portion in the oil temperature detecting step during the start of the engine, the automatic transmission itself and hydraulic fluid contained therein have cooled, for example, because the vehicle has been stopped for a long time. Thus, even if the oil temperature detected by the oil temperature detecting portion in the oil temperature detecting step is high, it is quite likely that a temperature in the vicinity of the clutch should not have risen sufficiently. Therefore, the oil temperature threshold for prohibiting a gear shift to a specific gear stage is set high. If hydraulic fluid contained in the automatic transmission is determined to be at a high temperature as a result of the detection carried out during the start of the engine, the automatic transmission itself and hydraulic fluid contained therein have been warmed, for example, because the vehicle has been stopped for a short period. Thus, even if the oil temperature detected by the oil temperature detecting portion in the oil temperature detecting step is more or less low, it is quite likely that a temperature in the vicinity of the clutch should have risen. Therefore, the oil temperature threshold for prohibiting a gear shift to a specific gear stage is set low. Because the oil temperature threshold has thus been set, it is possible to precisely calculate an oil temperature threshold for prohibiting a gear shift to a specific gear stage even in the case where it is impossible to precisely measure an oil temperature in the vicinity of a frictional coupling element of the automatic transmission due to a complicated structure. As a result, there is no need to mount a large number of oil temperature sensors in coordination with the construction of a hydraulic circuit of the automatic transmission, and gear shifts in the automatic transmission can be controlled on the basis of a temperature of hydraulic fluid contained in the automatic transmission that is mounted in the vehicle.

According to the above-mentioned construction, a timing for starting the engine can be detected on the basis of an operation that is performed by the user to turn the ignition switch on or off.

Further, according to the above-mentioned construction, a gear shift to a specific gear stage which is based on a clutch-to-clutch operation and which is made to switch the clutch to be engaged from one to another using a direct clutch is greatly influenced by a deterioration in responsiveness resulting from a fall in temperature of the hydraulic fluid contained in the automatic transmission and tends to cause a gear-shift shock. Hence, the gear shift to the specific gear stage is prohibited until a detected oil temperature exceeds an oil temperature threshold that has been calculated on the basis of a hydraulic fluid temperature, an engine coolant temperature, an engine intake air temperature, an engine stop time, and the like, at the time when the engine is started. As a result, it is possible to realize a control device and a control method which can inhibit the occurrence of a gear-shift shock.

[Second Embodiment]

The ECT-ECU 100 in accordance with the second embodiment detects a time when the engine is started on the basis of a signal input from the ignition switch 200, detects an engine coolant temperature at that moment, and stores it in the memory as an initial coolant temperature. The ECT-ECU 100 calculates an oil temperature threshold on the basis of the initial coolant temperature and a relationship that is stored in the memory and that indicates how the oil temperature threshold is related to initial coolant temperature. As shown in FIG. 4, according to the relationship that is stored in the memory and that indicates how oil temperature threshold is related to the initial coolant temperature, the oil temperature threshold rises in proportion to a fall in the initial coolant temperature and falls in proportion to a rise in the initial coolant temperature. Although the initial coolant temperature and oil temperature threshold establish a linear relationship in FIG. 4, other relationships are possible as well. Also, the system of the automatic transmission in accordance with the second embodiment is identical in construction to the system in accordance with the above-mentioned first embodiment. Accordingly, detailed description thereof will not be repeated hereinafter.

Figure 5:
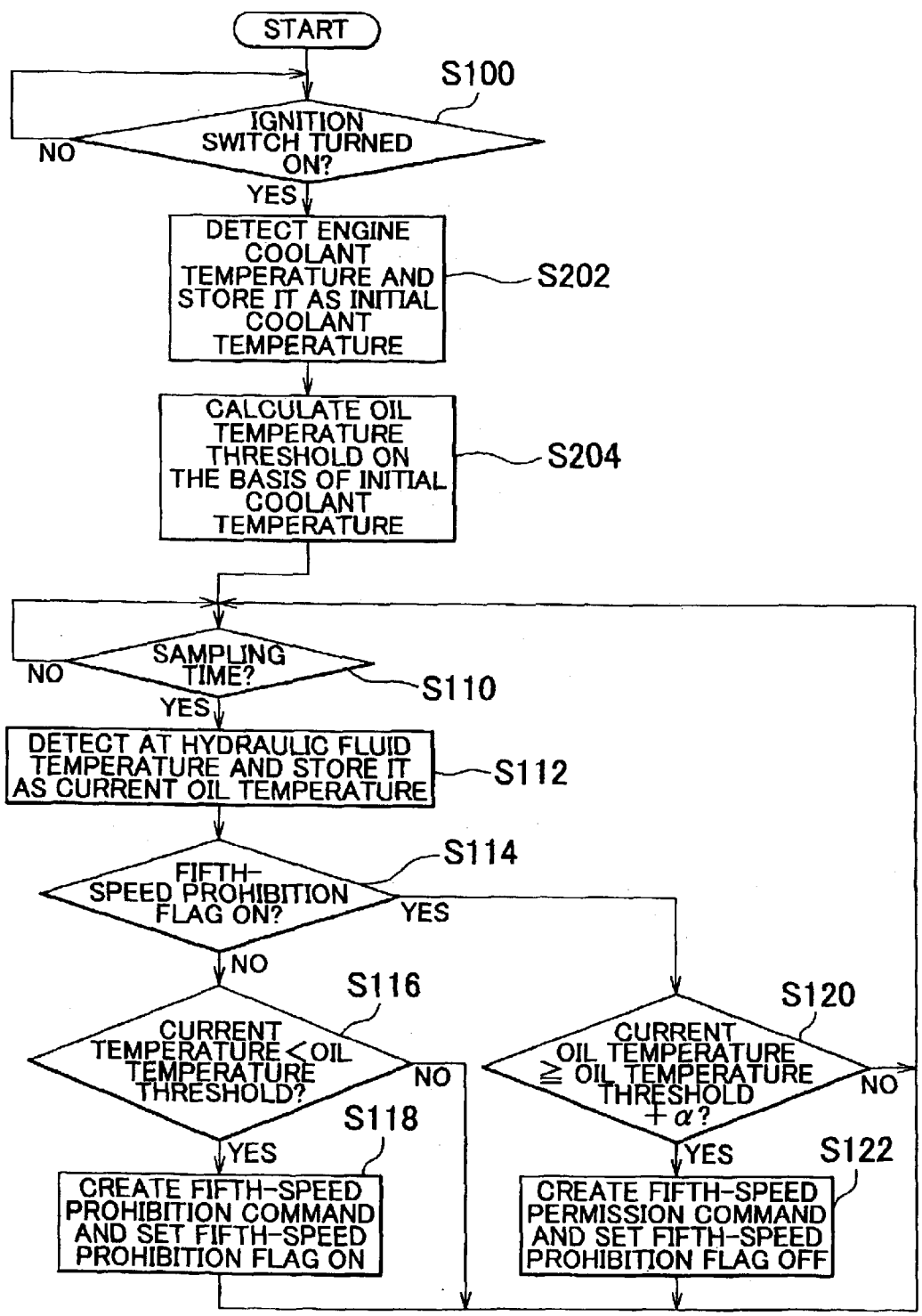
FIG. 5 is a flowchart showing a control structure of a program that is executed by the ECT-ECU in accordance with the second embodiment of the invention.

A control structure of a program executed by the ECT-ECU 100 that realizes the control device for the automatic transmission in accordance with the second embodiment will be described with reference to FIG. 5. In the flowchart shown in FIG. 5, flow sequences identical to those in the above-mentioned flowchart shown in FIG. 3 are denoted by the same step numbers. Accordingly, a detailed description thereof will not be repeated hereinafter.

In S202, the ECT-ECU 100 detects an engine coolant temperature on the basis of a signal input from the engine coolant temperature sensor 300 and stores it in the memory as an initial coolant temperature. In S204, the ECT-ECU 100 calculates an oil temperature threshold on the basis of the initial coolant temperature stored in the memory. At this moment, the oil temperature threshold is calculated on the basis of the detected initial coolant temperature and a relationship indicating how the oil temperature threshold is related to the initial coolant temperature (FIG. 4). The flow sequences in S110 to S112 are thereafter performed repeatedly at intervals of a sampling time.

Operation of the ECT-ECU 100 that is based on the structure and the flowchart as mentioned above and that realizes the control device for the automatic transmission in accordance with the second embodiment will be described.

If a user of the vehicle turns the ignition switch on (YES in S100), the ECT-ECU 100 detects an engine coolant temperature on the basis of a signal input from the engine coolant temperature sensor 300 and stores it in the memory as an initial coolant temperature (S200). An oil temperature threshold is calculated on the basis of the detected initial coolant temperature and the relationship indicating how the oil temperature threshold is related to the initial coolant temperature (S204). In the case where the sampling time is reached while the vehicle is running (YES in S110), if a current oil temperature detected on the basis of a signal input from the AT hydraulic fluid temperature sensor 500 is lower than the oil temperature threshold calculated on the basis of the initial coolant temperature (YES in S116), a fifth-speed prohibition command is created and the fifth-speed prohibition flag is set to "Son" (S118).

If the temperature of hydraulic fluid contained in the automatic transmission rises because the vehicle has continuously run, the current oil temperature becomes equal to or higher than (the oil temperature threshold +α) (YES in S120), a fifth-speed permission command is created, and the fifth-speed prohibition flag is set to "off" (S122).

Thus, according to the control device for the automatic transmission in accordance with the second embodiment, an oil temperature threshold is calculated on the basis of an engine coolant temperature at the time when the engine is started, and fifth-speed prohibition control is performed on the basis of the oil temperature threshold.

In the case where the operation as described above is performed, the oil temperature threshold is a threshold that has been calculated on the basis of an initial coolant temperature at the time when the engine is started. If engine coolant is determined to be at a low temperature as a result of the detection carried out during the start of the engine, the automatic transmission itself and hydraulic fluid contained therein have cooled because the vehicle has been stopped for a long time. Thus, even if the oil temperature detected by the AT hydraulic fluid temperature sensor is high, it is quite likely that a temperature in the vicinity of a clutch that is used in making a gear shift from fourth speed to fifth speed should not have risen sufficiently. Therefore, the oil temperature threshold for prohibiting a gear shift from fourth speed to fifth speed is set high. On the other hand, if engine coolant is determined to be at a high temperature as a result of the detection carried out during the start of the engine, the automatic transmission itself and hydraulic fluid contained therein have been warmed because the vehicle has been stopped for a short time. Thus, even if the oil temperature detected by the AT hydraulic fluid temperature sensor is more or less low, it is quite likely that a temperature in the vicinity of the clutch that is used in making a gear shift from fourth speed to fifth speed should have risen. Therefore, the oil temperature threshold for prohibiting a gear shift from fourth speed to fifth speed is set low.

As described above, according to the control device and the control method for the automatic transmission in accordance with the second embodiment, if the engine coolant is determined to be at a low temperature as a result of the detection carried out during the start of the engine, the automatic transmission itself and the hydraulic fluid contained therein have cooled, for example, because the vehicle has been stopped for a long time. Thus, even if the oil temperature detected by the oil temperature detecting portion in the oil temperature detecting step is high, it is quite likely that a temperature in the vicinity of the clutch should not have risen sufficiently. Therefore, the oil temperature threshold for prohibiting a gear shift to a specific gear stage is set high. If the engine coolant is determined to be at a high temperature as a result of the detection carried out during the start of the engine, the automatic transmission itself and hydraulic fluid contained therein have been warmed, for example, because the vehicle has been stopped for a short time. Thus, even if the oil temperature detected by the oil temperature detecting portion is more or less low, it is quite likely that a temperature in the vicinity of the clutch should have risen. Therefore, the oil temperature threshold for prohibiting a gear shift to a specific gear stage is set low. According to the above-mentioned construction, even if it is impossible to precisely measure an oil temperature in the vicinity of a frictional coupling element of the automatic transmission due to a complicated structure, it is possible to calculate an oil temperature threshold for prohibiting a gear shift to a specific gear stage (e.g., a gear shift from fourth speed to fifth speed in the case of a five-speed automatic transmission) on the basis of an engine coolant temperature at the time when the engine is started. As a result, it is possible to provide a gear-shift control device and a gear-shift control method for controlling a gear shift in an automatic transmission installed in a vehicle on the basis of a temperature of hydraulic fluid contained in the automatic transmission without the necessity of mounting a large number of oil temperature sensors in coordination with the construction of a hydraulic circuit of the automatic transmission. Because the oil temperature threshold has thus been set, it is possible to precisely calculate an oil temperature threshold for prohibiting a gear shift to a specific gear stage even in the case where it is impossible to precisely measure an oil temperature in the vicinity of a frictional coupling element of the automatic transmission due to a complicated structure.

[Third Embodiment]

Figure 6:
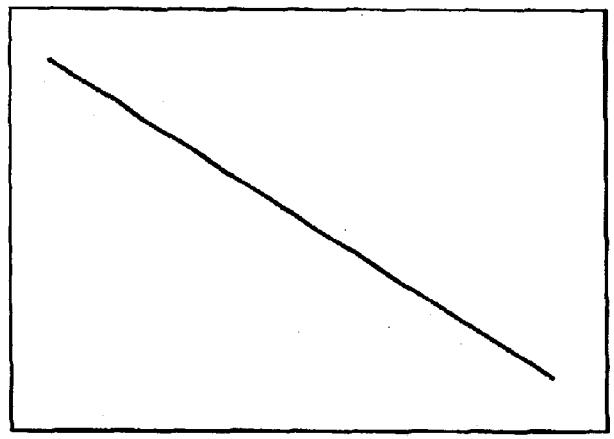
FIG. 6 shows a relationship that is stored in a memory of an ECT-ECU in accordance with the third embodiment of the invention and that indicates how the oil temperature threshold is related to the initial intake air temperature.

The ECT-ECU 100 in accordance with the third embodiment detects start of the engine on the basis of a signal input from the ignition switch 200, detects a temperature of intake air introduced into the engine at that moment, and stores it in the memory as an initial intake air temperature. The ECT-ECU 100 calculates an oil temperature threshold on the basis of the initial intake air temperature and a relationship that is stored in the memory and that indicates how the oil temperature threshold is related to the initial intake air temperature. As shown in FIG. 6, according to the relationship that is stored in the memory and that indicates how the oil temperature threshold is related to the initial intake air temperature, the oil temperature threshold rises in proportion to a fall in the initial intake air temperature and falls in proportion to a rise in the initial intake air temperature. Although the initial intake air temperature and oil temperature threshold establish a linear relationship in FIG. 6, other relationships are possible as well. Also, the system of the automatic transmission in accordance with the third embodiment is identical in construction to the system in accordance with the above-mentioned first embodiment. Accordingly, a detailed description thereof will not be repeated hereinafter.

Figure 7:
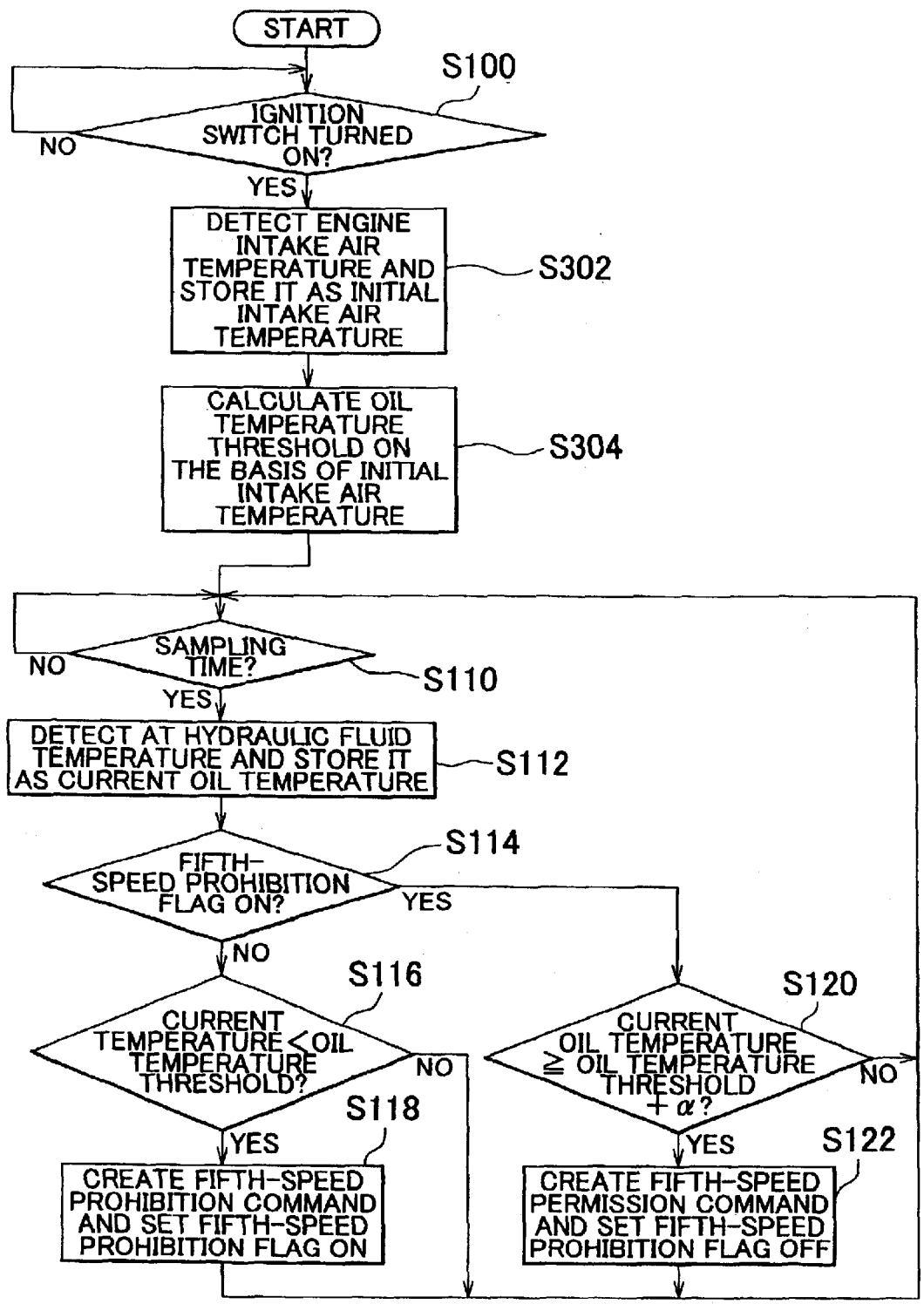
FIG. 7 is a flowchart showing a control structure of a program that is executed by the ECT-ECU in accordance with the third embodiment of the invention.

A control structure of a program executed by the ECT-ECU 100 that realizes the control device for the automatic transmission in accordance with the third embodiment will be described with reference to FIG. 7. In the flowchart shown in FIG. 7, flow sequences identical to those in the above-mentioned flowchart shown in FIG. 3 are denoted by the same step numbers. Accordingly, detailed description thereof will not be repeated hereinafter.

In S302, the ECT-ECU 100 detects an engine intake air temperature on the basis of a signal input from the engine intake air temperature sensor 400 and stores it in the memory as an initial intake air temperature. In S304, the ECT-ECU 100 calculates an oil temperature threshold on the basis of the initial intake air temperature stored in the memory. At this moment, the oil temperature threshold is calculated on the basis of the detected initial intake air temperature and a relationship indicating how the oil temperature threshold is related to the initial intake air temperature. The flow sequences in S110 to S112 are thereafter performed repeatedly at intervals of a sampling time.

Operation of the ECT-ECU 100 that is based on the structure and the flowchart as mentioned above and that realizes the control device for the automatic transmission in accordance with the third embodiment will be described.

If a user of the vehicle turns the ignition switch on (YES in S100), the ECT-ECU 100 detects an engine intake air temperature on the basis of a signal input from the engine intake air temperature sensor 400 and stores it in the memory as an initial intake air temperature (S302). An oil temperature threshold is calculated on the basis of the initial intake air temperature stored in the memory and the relationship indicating how the oil temperature threshold is related to the initial intake air temperature (S304).

In the case where the sampling time is reached while the vehicle is running (YES in S110), the ECT-ECU 100 detects a temperature of AT hydraulic fluid on the basis of a signal input from the AT hydraulic fluid temperature sensor 500 and stores it in the memory as a current oil temperature (S112). If the fifth-speed prohibition flag is not on (NO in S114) and if a current oil temperature is lower than the oil temperature threshold calculated on the basis of the initial intake air temperature (YES in S116), a fifth-speed prohibition command is created and the fifth-speed prohibition flag is set to "on" (S118).

If the temperature of hydraulic fluid contained in the automatic transmission rises because the vehicle has continuously run, the current oil temperature becomes equal to or higher than (the oil temperature threshold +α) (YES in S120), a fifth-speed permission command is created, and the fifth-speed prohibition flag is set to "off" (S122).

Thus, according to the control device for the automatic transmission in accordance with the third embodiment, an oil temperature threshold is calculated on the basis of a temperature of intake air introduced into the engine at the time when the engine is started, and fifth-speed prohibition control is performed on the basis of the oil temperature threshold.

In the case where the operation as described above is performed, the oil temperature threshold is a threshold that has been calculated on the basis of an initial intake air temperature at the time when the engine is started. As shown in FIG. 6, if intake air introduced into the engine is determined to be at a low temperature as a result of the detection carried out during the start of the engine, the automatic transmission itself and hydraulic fluid contained therein are unlikely to be warm because the atmosphere surrounding the vehicle has a low temperature. Thus, even if the oil temperature detected by the AT hydraulic fluid temperature sensor is high, it is quite likely that a temperature in the vicinity of a clutch that is used in making a gear shift from fourth speed to fifth speed should not have risen sufficiently. Therefore, the oil temperature threshold for prohibiting a gear shift from fourth speed to fifth speed is set high. On the other hand, if intake air introduced into the engine is determined to be at a high temperature as a result of the detection carried out during the start of the engine, the automatic transmission itself and hydraulic fluid contained therein are likely to be warm because the atmosphere surrounding the vehicle has a high temperature. Thus, even if the oil temperature detected by the AT hydraulic fluid temperature sensor is more or less low, it is quite likely that a temperature in the vicinity of the clutch that is used in making a gear shift from fourth speed to fifth speed should have risen. Therefore, the oil temperature threshold for prohibiting a gear shift from fourth speed to fifth speed is set low.

As described above, according to the control device and the control method for the automatic transmission in accordance with the third embodiment, if intake air introduced into the engine is determined to be at a low temperature as a result of the detection carried out during the start of the engine, hydraulic fluid contained in the automatic transmission is unlikely to be warm, for example, because the atmosphere surrounding the vehicle is at a low temperature. Thus, even if the oil temperature detected by the oil temperature detecting portion in the oil temperature detecting step is high, it is quite likely that a temperature in the vicinity of the clutch should not have risen sufficiently. Therefore, the oil temperature threshold for prohibiting a gear shift to a specific gear stage is set high. If intake air introduced into the engine is determined to be at a high temperature as a result of the detection carried out during the start of the engine, hydraulic fluid contained in the automatic transmission is likely to be warm, for example, because the atmosphere surrounding the vehicle is at a high temperature. Thus, even if the oil temperature detected by the oil temperature detecting portion is more or less low, it is quite likely that a temperature in the vicinity of the clutch should have risen. Therefore, the oil temperature threshold for prohibiting a gear shift to a specific gear stage is set low. According to the above-mentioned construction, even if it is impossible to precisely measure an oil temperature in the vicinity of a frictional coupling element of the automatic transmission due to a complicated structure, it is possible to calculate an oil temperature threshold for prohibiting a gear shift from fourth speed to fifth speed on the basis of a temperature of intake air introduced into the engine at the time when the engine is started. As a result, there is no need to mount a large number of oil temperature sensors in coordination with the construction of a hydraulic circuit of the automatic transmission, and it is possible to control a gear shift in an automatic transmission installed in a vehicle on the basis of a temperature of hydraulic fluid contained in the automatic transmission. Hence, it is possible to precisely calculate an oil temperature threshold for prohibiting a gear shift to a specific gear stage even in the case where it is impossible to precisely measure an oil temperature in the vicinity of a frictional coupling element of the automatic transmission due to a complicated structure.

[Fourth Embodiment]

Figure 8:
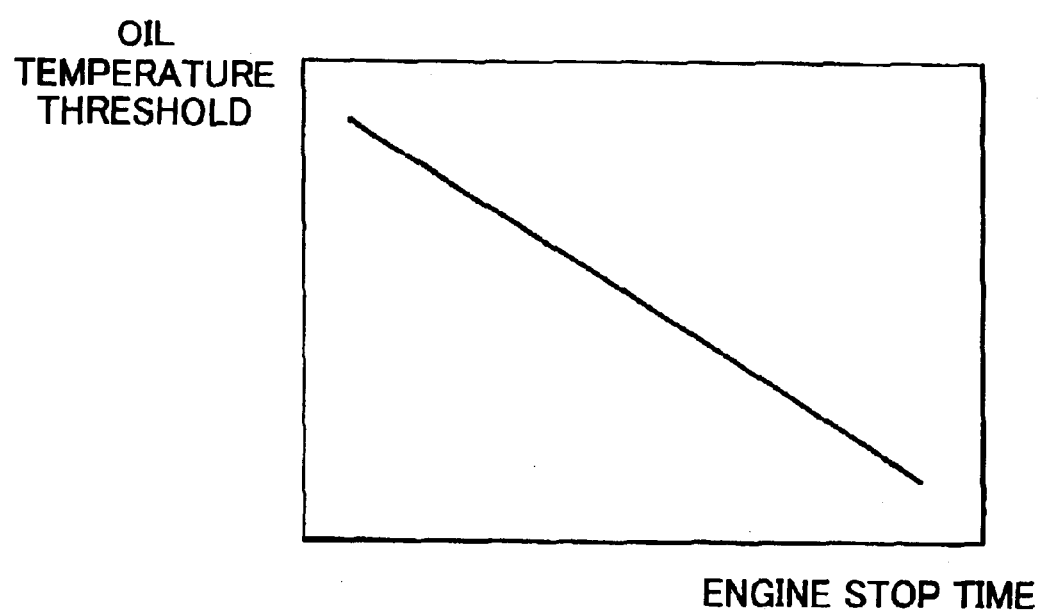
FIG. 8 shows a relationship that is stored in a memory of an ECT-ECU in accordance with the fourth embodiment of the invention and that indicates how the oil temperature threshold is related to the engine stop time.

The ECT-ECU 100 in accordance with the fourth embodiment detects the start of the engine on the basis of a signal input from the ignition switch 200, detects a time that elapses from a timing when the engine is stopped the last time to a timing when the engine is started this time, and stores it into the memory as an engine stop time. The ECT-ECU 100 calculates an oil temperature threshold on the basis of the engine stop time and a relationship that is stored in the memory and that is established between the engine stop time and the oil temperature threshold. As shown in FIG. 8, according to the relationship that is stored in the memory and that indicates how the oil temperature threshold is related to the engine stop time, the oil temperature threshold rises in proportion to a decrease in the engine stop time and falls in proportion to an increase in the engine stop time. Although the engine stop time and oil temperature threshold establish a linear relationship in FIG. 8, other relationships are possible as well. Also, the system of the automatic transmission in accordance with the fourth embodiment is identical in construction to the system in accordance with the above-mentioned first embodiment. Accordingly, a detailed description thereof will not be repeated hereinafter.

Figure 9:
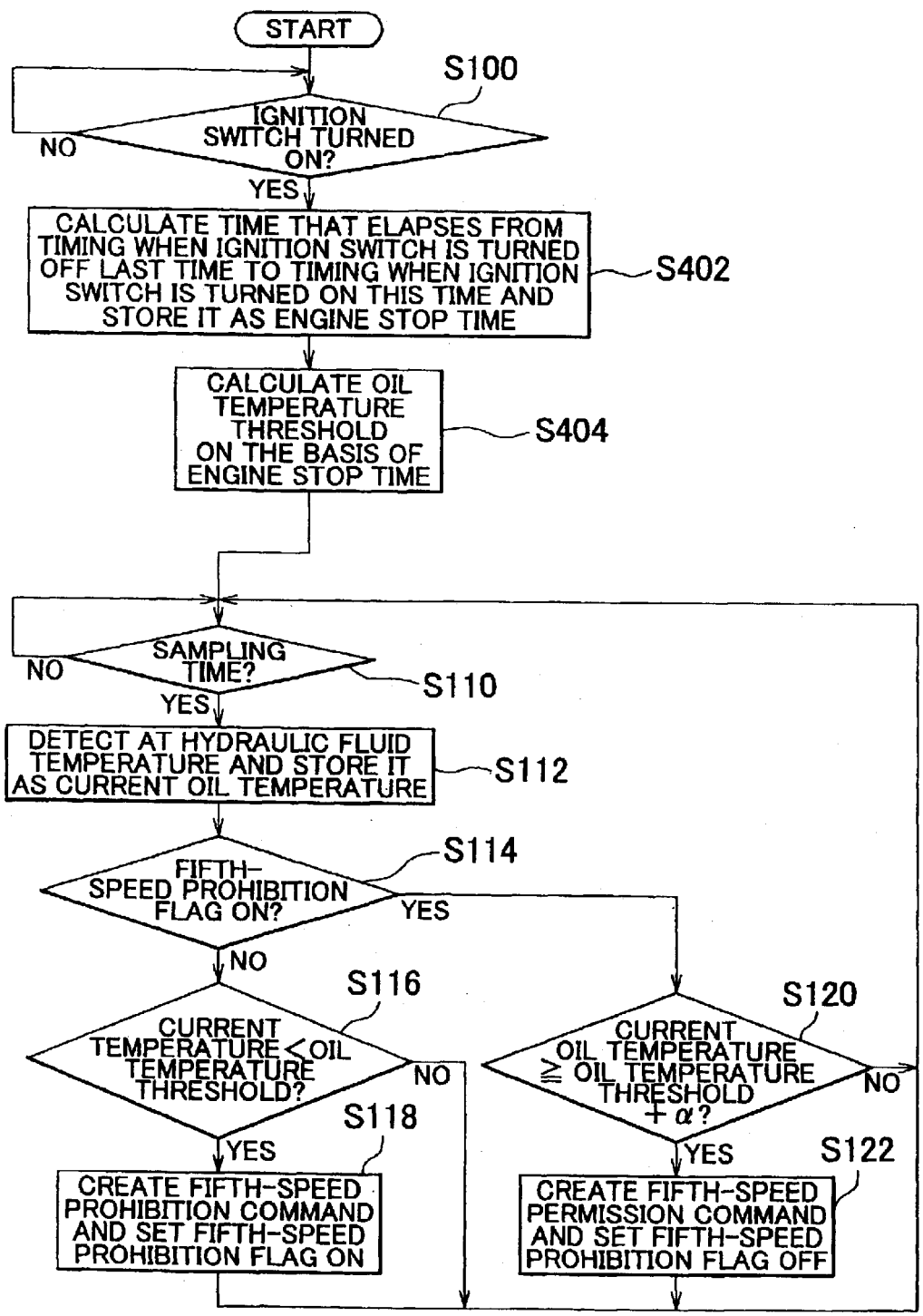
FIG. 9 is a flowchart showing a control structure of a program that is executed by the ECT-ECU in accordance with the fourth embodiment of the invention.

A control structure of a program executed by the ECT-ECU 100 that realizes the control device for the automatic transmission in accordance with the fourth embodiment will be described with reference to FIG. 9. In the flowchart shown in FIG. 9, flow sequences identical to those in the above-mentioned flowchart shown in FIG. 3 are denoted by the same step numbers. Accordingly, a detailed description thereof will not be repeated hereinafter.

In S402, the ECT-ECU 100 detects a time that elapses from a timing when the ignition switch is turned off the last time to a timing when the ignition switch is turned on this time, and stores it in the memory as an engine stop time. In S404, the ECT-ECU 100 calculates an oil temperature threshold on the basis of the engine stop time stored in the memory. At this moment, the oil temperature threshold is calculated on the basis of the detected engine stop time and a relationship indicating how the oil temperature threshold is related to the engine stop time (FIG. 8). The processings in S110 to S112 are thereafter performed repeatedly at intervals of a sampling time.

Operation of the ECT-ECU 100 that is based on the structure and the flowchart as mentioned above and that realizes the control device for the automatic transmission in accordance with the fourth embodiment will be described.

If a user of the vehicle turns the ignition switch on (YES in S100), the ECT-ECU 100 detects a time that elapses from a timing when the ignition switch is turned off last time to a timing when the ignition switch is turned on this time, and stores it in the memory as an engine stop time (S402). The ECT-ECU 100 calculates an oil temperature threshold on the basis of the calculated engine stop time. At this moment, the oil temperature threshold is calculated on the basis of the calculated engine stop time and the relationship indicating how the oil temperature threshold is related to the engine stop time.

If the sampling time has been reached after takeoff of the vehicle (YES in S100), the ECT-ECU 100 detects an AT hydraulic fluid temperature on the basis of a signal input from the AT hydraulic fluid temperature sensor 500 and stores it in the memory as a current oil temperature (S112). If the fifth-speed flag is not on (No in S114) and if the current oil temperature is lower than the oil temperature threshold that has been calculated on the basis of the engine stop time (YES in S116), a fifth-speed prohibition command is created and the fifth-speed prohibition flag is set to "on" (S118).

If the temperature of hydraulic fluid contained in the automatic transmission rises because the vehicle has continuously run, the current oil temperature becomes equal to or higher than (the oil temperature threshold +α) (YES in S120), a fifth-speed permission command is created, and the fifth-speed prohibition flag is set to "off" (S122).

Thus, according to the control device for the automatic transmission in accordance with the fourth embodiment, an oil temperature threshold is calculated on the basis of an engine stop time, and fifth-speed prohibition control is performed on the basis of the oil temperature threshold.

In the case where the operation as described above is performed, the oil temperature threshold is a threshold that has been calculated on the basis of an engine stop time at the time when the engine is started. As shown in FIG. 8, if a time that elapses from a timing when the engine is stopped last time to a timing when the engine is started this time is determined to be long as a result of the detection carried out during the start of the engine, the automatic transmission itself and hydraulic fluid contained therein have cooled and are unlikely to be warmed. Thus, even if the oil temperature detected by the AT hydraulic fluid temperature sensor is high, it is quite likely that a temperature in the vicinity of a clutch that is used in making a gear shift from fourth speed to fifth speed should not have risen sufficiently. Therefore, the oil temperature threshold for prohibiting a gear shift from fourth speed to fifth speed is set high. On the other hand, if a time that elapses from a timing when the engine is stopped last time to a timing when the engine is started this time is determined to be short as a result of the detection carried out during the start of the engine, the automatic transmission itself and hydraulic fluid contained therein are likely to be warm. Thus, even if the oil temperature detected by the AT hydraulic fluid temperature sensor is more or less low, it is quite likely that a temperature in the vicinity of the clutch that is used in making a gear shift from fourth speed to fifth speed should have risen. Therefore, the oil temperature threshold for prohibiting a gear shift from fourth speed to fifth speed is set low.

As described above, according to the control device and the control method for the automatic transmission in accordance with the fourth embodiment, if a time that elapses from a timing when the engine is stopped last time to a timing when the engine is started this time is determined to be long as a result of the detection carried out during the start of the engine, the automatic transmission itself and hydraulic fluid contained therein have cooled and are unlikely to be warm. Thus, even if the oil temperature detected by the oil temperature detecting portion in the oil temperature detecting step is high, it is quite likely that a hydraulic fluid temperature in the vicinity of the clutch should not have risen sufficiently. Therefore, the oil temperature threshold for prohibiting a gear shift to a specific gear stage is set high. If a time that elapses from a timing when the engine is stopped last time to a timing when the engine is started this time is determined to be short as a result of the detection carried out during the start of the engine, the automatic transmission itself and hydraulic fluid contained therein are likely to be warm. Thus, even if the oil temperature detected by the oil temperature detecting portion in the oil temperature detecting step is more or less low, it is quite likely that a temperature in the vicinity of the clutch should have risen. Therefore, the oil temperature threshold for prohibiting a gear shift to a specific gear stage is set low. According to the above-mentioned construction, even if it is impossible to precisely measure an oil temperature in the vicinity of a frictional coupling element of the automatic transmission due to a complicated structure, it is possible to calculate an oil temperature threshold for prohibiting a gear shift from fourth speed to fifth speed on the basis of an engine stop time at the time when the engine is started. As a result, there is no need to mount a large number of oil temperature sensors in coordination with the construction of a hydraulic circuit of the automatic transmission, and it is possible to control a gear shift in an automatic transmission installed in a vehicle on the basis of a temperature of hydraulic fluid contained in the automatic transmission. Because the oil temperature threshold has thus been set, it is possible to precisely calculate an oil temperature threshold for prohibiting a gear shift to a specific gear stage even in the case where it is impossible to precisely measure an oil temperature in the vicinity of a frictional coupling element of the automatic transmission due to a complicated structure.

[Fifth Embodiment]

The ECT-ECU 100 in accordance with the fifth embodiment detects the start of the engine on the basis of a signal input from the ignition switch 200, and calculates an oil temperature threshold on the basis of one of a temperature of the hydraulic fluid contained in the automatic transmission (initial oil temperature), an engine coolant temperature (initial coolant temperature), and a temperature of intake air introduced into the engine (initial intake air temperature) and one of a relationship that is stored in the memory and that indicates how the oil temperature threshold is related to the initial oil temperature, a relationship that is stored in the memory and that indicates how the oil temperature threshold is related to the initial coolant temperature, and a relationship that is stored in the memory and that indicates how the oil temperature threshold is related to the initial intake air temperature.

The ECUT-ECU 100 respectively determines, on the basis of signals input from the engine coolant temperature sensor 300, the engine intake air temperature sensor 400, and the AT hydraulic fluid temperature sensor 500, whether or not these sensors are abnormal. For example, if the signal input to the ECT-ECU 100 from a certain one of the sensors is out of a measurable range, it is determined that the signal line extending from that sensor has been short-circuited or broken. If the signal input to the ECT-ECU 100 from a certain one of the sensors is within the measurable range but remains unchanged for a long time, it is also determined that that sensor is abnormal. The ECT-ECU 100 selects a normal one of the sensors on the basis of this determination, and calculates an oil temperature threshold on the basis of one of a temperature of hydraulic fluid contained in the automatic transmission (initial oil temperature), an engine coolant temperature (initial coolant temperature), and a temperature of intake air introduced into the engine (initial intake air temperature).

The system of the automatic transmission in accordance with the fifth embodiment is identical in construction to the system in accordance with the above-mentioned first embodiment. Accordingly, a detailed description thereof will not be repeated hereinafter.

A control structure of a program executed by the ECT-ECU 100 that realizes the control device for the automatic transmission in accordance with the fifth embodiment will be described with reference to FIG. 10. In the flowchart shown in FIG. 10, flow sequences identical to those in the above-mentioned flowchart shown in FIG. 3 are denoted by the same step numbers. Accordingly, detailed description thereof will not be repeated hereinafter.

In S502, on the basis of signals input from the engine coolant temperature sensor 300 and the engine intake air temperature sensor.400, the ECT-ECU 100 makes determination concerning an abnormal state of each of the sensors. At this moment, if the signal input from a certain one of the sensors is out of a predetermined measurable range, it is determined that that sensor is abnormal. Alternatively, if the signal input from a certain one of the sensors remains unchanged for a predetermined time, an abnormal state of that sensor is detected.

In S504, the ECT-ECU 100 determines whether or not the engine coolant temperature sensor 300 is abnormal. If the engine coolant temperature sensor 300 is abnormal (YES in S504), the operation is shifted to S506. If the engine coolant temperature sensor 300 is not abnormal (NO in S504), the operation is shifted to S508.

In S506, the ECT-ECU 100 determines whether or not the engine intake air temperature sensor 400 is abnormal. If the engine intake temperature sensor 400 is abnormal (YES in S506), the operation is shifted to S516. If the engine intake temperature sensor 400 is not abnormal (NO in S506), the operation is shifted to S512.

In S508, the ECT-ECU 100 detects an engine coolant temperature and stores it in the memory as an initial coolant temperature. In S510, the ECT-ECU 100 calculates an oil temperature threshold on the basis of the initial coolant temperature. At this moment, the relationship indicating how the oil temperature threshold is related to the initial coolant temperature (FIG. 4) is used.

In S512, the ECT-ECU 100 detects an engine intake air temperature and stores it in the memory as an initial intake air temperature. In S514, the ECT-ECU 100 calculates an oil temperature threshold on the basis of the initial intake air temperature. At this moment, the relationship indicating how the oil temperature threshold is related to the initial intake air temperature (FIG. 6) is used.

In S516, the ECT-ECU 100 detects an AT hydraulic fluid temperature and stores it in the memory as an initial oil temperature. In S518, the ECT-ECU 100 calculates an oil temperature threshold on the basis of the initial oil temperature. At this moment, the relationship indicating how the oil temperature threshold is related to the initial oil temperature (FIG. 2) is used.

After the processings in S510, S514, and S518 have been performed, the processings in S110 to S122 are repeatedly performed at intervals of a sampling time.

Operation of the ECT-ECU 100 that is based on the structure and the flowchart as mentioned above and that realizes the control device for the automatic transmission in accordance with the fifth embodiment will be described.

If a user of the vehicle turns the ignition switch on (NO in S100), a determination concerning an abnormal state of each of the engine coolant temperature sensor 300 and the engine intake air temperature sensor 400 is made on the basis of a signal input therefrom (S502).

If the engine coolant temperature sensor 300 is not abnormal (YES in S504), an engine coolant temperature is detected and stored in the memory as an initial coolant temperature, and an oil temperature threshold is calculated on the basis of the initial coolant temperature (S508, S510).

If the engine coolant temperature sensor 300 is abnormal (YES in S504) and if the engine intake air temperature sensor 400 is not abnormal (NO in S506), an engine intake air temperature is detected and stored in the memory as an initial intake air temperature, and an oil temperature threshold is calculated on the basis of the initial intake air temperature (S512, S514).

If the engine coolant temperature sensor 300 is abnormal (YES in S504) and if the engine intake air temperature sensor 400 is abnormal (YES in S506), an AT hydraulic fluid temperature is detected and stored in the memory as an initial oil temperature, and an oil temperature threshold is calculated on the basis of the initial oil temperature (S516, S518).

Thus, on the basis of states of the engine coolant temperature sensor 300 and the engine intake air temperature sensor 400, control for prohibiting a gear shift from fourth speed to fifth speed is performed on the basis of an oil temperature threshold that has been calculated on the basis of one of an engine coolant temperature, an engine intake air temperature, and an AT hydraulic fluid temperature.

As described above, according to the ECT-ECU that realizes the control device for the automatic transmission in accordance with the fifth embodiment, an oil temperature threshold is calculated on the basis of one of an oil temperature detected by the oil temperature detecting portion in the oil temperature detecting step, a coolant temperature detected by the coolant temperature detecting portion as coolant temperature detecting means in the coolant temperature detecting step, the intake air temperature detected by the intake air temperature detecting portion in the intake air temperature detecting step when the engine is started. If the coolant temperature detecting portion is abnormal, for example, with the coolant temperature detected in the coolant temperature detecting step being out of a measurable range, an oil temperature threshold is calculated on the basis of an oil temperature detected by the oil temperature detecting portion in the oil temperature detecting step or the intake air temperature detected by the intake air temperature detecting portion in the intake air temperature detecting step. If the intake air temperature detecting portion is abnormal, for example, with the intake air temperature detected in the intake air temperature detecting step being out of a measurable range, an oil temperature threshold is calculated on the basis of an oil temperature detected by the oil temperature detecting portion in the oil temperature detecting step or a coolant temperature detected by the coolant temperature detecting portion in the coolant temperature detecting step. If the coolant temperature detecting portion is abnormal, for example, with a coolant temperature detected in the coolant temperature detecting step being out of the measurable range or if the intake air temperature detecting portion is abnormal, for example, with the intake air temperature detected in the intake air temperature detecting step being out of the measurable range, an oil temperature threshold is calculated on the basis of an oil temperature detected by the oil temperature detecting portion in the oil temperature detecting step. As described above, it is possible to structure a backup system for contending with abnormality of the detecting portions and the detecting steps.

According to the above-mentioned construction, if the coolant temperature sensor is abnormal for example, an oil temperature threshold is calculated on the basis of an oil temperature detected by the oil temperature detecting portion in the oil temperature detecting step or the intake air temperature detected by the intake air temperature sensor. If the intake air temperature sensor is abnormal, an oil temperature threshold is calculated on the basis of an oil temperature detected by the oil temperature detecting portion in the oil temperature detecting step or a coolant temperature detected by the coolant temperature sensor. If the coolant temperature sensor and the intake air temperature sensor are abnormal, an oil temperature threshold is calculated on the basis of an oil temperature detected by the oil temperature detecting portion. As described above, it is possible to structure a backup system for contending with abnormality of the sensors.

According to the above-mentioned construction, if the coolant temperature sensor is abnormal, an oil temperature threshold is calculated on the basis of an oil temperature detected by the oil temperature detecting portion in the oil temperature detecting step or the intake air temperature detected by the intake air temperature sensor. If the intake air temperature sensor is abnormal, an oil temperature threshold is calculated on the basis of an oil temperature detected by the oil temperature detecting portion in the oil temperature detecting step or a coolant temperature detected by the coolant temperature sensor. If the coolant temperature sensor and the intake air temperature sensor are abnormal, an oil temperature threshold is calculated on the basis of an oil temperature detected by the oil temperature detecting portion in the oil temperature detecting step. Thus, it is possible to structure a backup system for contending with abnormality of the sensors.

[Sixth Embodiment]

As the AT hydraulic fluid temperature sensor 500 to which the ECT-ECU 100 in accordance with the sixth embodiment is connected, a first AT oil temperature sensor and a second AT oil temperature sensor are provided. The first and second AT oil temperature sensors may be disposed either at the same position or at different positions. It is not absolutely required that the number of the sensors be two.

The ECT-ECU 100 makes determination concerning an abnormal state of each of the first and second AT oil temperature sensors on the basis of signals input therefrom. For example, if a signal input to the ECT-ECU 100 is out of a measurable range, it is determined that a signal line extending from a corresponding one of the sensors has been short-circuited or broken. If a signal input to the ECT-ECU 100 is within the measurable range but remains unchanged for a long time, it is also determined that a corresponding one of the sensors is abnormal. The ECT-ECU 100 selects a normal one of the sensors on the basis of this determination and detects a temperature of hydraulic fluid contained in the automatic transmission.

The system of the automatic transmission in accordance with the sixth embodiment is identical in construction to the system in accordance with the above-mentioned first embodiment, apart from the number of the oil temperature sensors. Accordingly, a detailed description thereof will not be repeated hereinafter.

Figure 11:
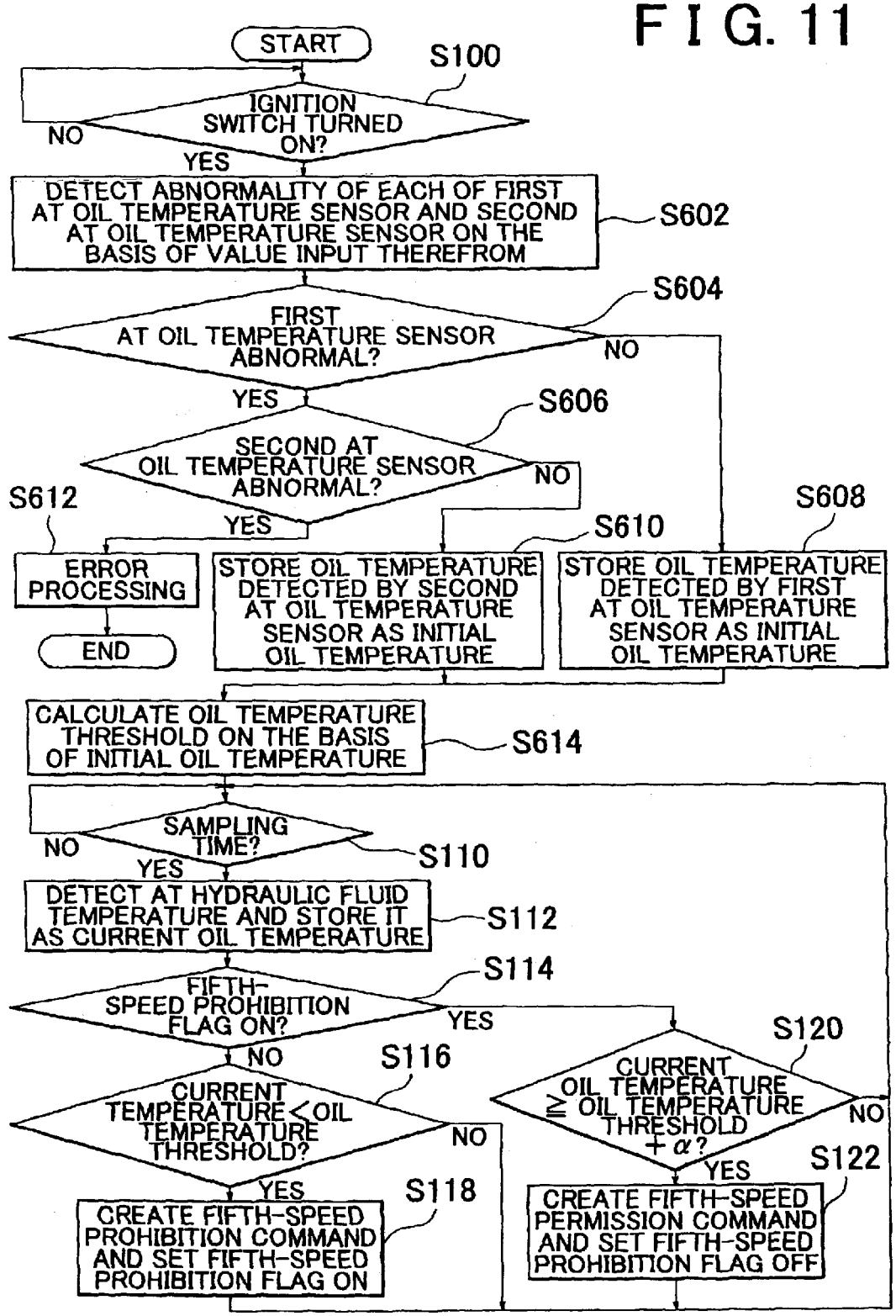
FIG. 11 is a flowchart showing a control structure of a program that is executed by an ECT-ECU in accordance with the sixth embodiment of the invention.

A control structure of a program executed by the ECT-ECU 100 that realizes the control device for the automatic transmission in accordance with the sixth embodiment will be described with reference to FIG. 11. In the flowchart shown in FIG. 11, flow sequences identical to those in the above-mentioned flowchart shown in FIG. 3 are denoted by the same step numbers. Accordingly, detailed description thereof will not be repeated hereinafter.

In S602, the ECT-ECU 100 makes a determination concerning abnormality of each of the first and second AT oil temperature sensors on the basis of values input therefrom. In S604, the ECT-ECU 100 determines whether or not the first AT oil temperature sensor is abnormal. If the first AT oil temperature sensor is abnormal (YES in S604), the operation is shifted to S606. If the first AT oil temperature sensor is not abnormal (NO in S604), the operation is shifted to S608.

In S606, the ECT-ECU 100 determines whether or not the second AT oil temperature sensor is abnormal. If the second AT oil temperature sensor is abnormal (YES in S606), the operation is shifted to S612. If the second AT oil temperature sensor is not abnormal (NO in S606), the operation is shifted to S610.

In S608, the ECT-ECU 100 stores an oil temperature detected by the first AT oil temperature sensor in the memory as an initial oil temperature. In S610, the ECT-ECU 100 stores an oil temperature detected by the second AT oil temperature sensor in the memory as an initial oil temperature.

In S612, the ECT-ECU 100 performs an error processing in the error processing in S612, the ECT-ECU 100 issues a warning that is based on the unmeasurability of a temperature of the oil contained in the automatic transmission.

In S614, the ECT-ECU 100 calculates an oil temperature threshold on the basis of an initial oil temperature detected by the first AT oil temperature sensor or the second AT oil temperature sensor. At this moment, the relationship indicating how the oil temperature threshold is related to the initial oil temperature (FIG. 2) is used. The flow sequences in S110 to S122 are thereafter performed repeatedly at intervals of a sampling time.

Operation of the ECT-ECU 100 that is based on the structure and the flowchart as mentioned above and that realizes the control device for the automatic transmission in accordance with the sixth embodiment will be described.

If a user of the vehicle turns the ignition switch on (YES in S100), determination concerning an abnormal state of each of the first and second AT oil temperature sensors is made on the basis of values input therefrom (S602). If the first AT oil temperature sensor is not abnormal (NO in S604), an oil temperature detected by the first AT oil temperature sensor is stored in the memory as an initial oil temperature (S608). If the first AT oil temperature sensor is abnormal (YES in S604) and if the second AT oil temperature sensor is not abnormal (No in S606), an oil temperature detected by the second AT oil temperature sensor is stored in the memory as an initial oil temperature (S610). If the first AT oil temperature sensor is abnormal (YES in S604) and if the second AT oil temperature sensor is abnormal (YES in S606), an error processing is performed (S612).

Thus, an oil temperature threshold is calculated on the basis of the initial oil temperature detected by the first AT oil temperature sensor or the second AT oil temperature sensor (S614), and control for prohibiting a gear shift from fourth speed to fifth speed is performed on the basis of the calculated oil temperature threshold (S110 to S122).

As described above, according to the ECT-ECU that realizes the control device for the automatic transmission in accordance with the sixth embodiment, two sensors for detecting a temperature of hydraulic fluid contained in the automatic transmission are provided, and an oil temperature detected by one of the sensors that has turned out to be normal is detected as a hydraulic fluid temperature. Thus, it is possible to structure a backup system for contending with abnormality of the sensors.

According to the above-mentioned construction, two or more sensors for detecting a hydraulic fluid temperature are provided, and an oil temperature detected by one of the sensors that has turned out to be normal is detected as a hydraulic fluid temperature. Thus, it is possible to structure a backup system for contending with abnormality of the sensors.

[Other Modification Examples]

Figure 10:
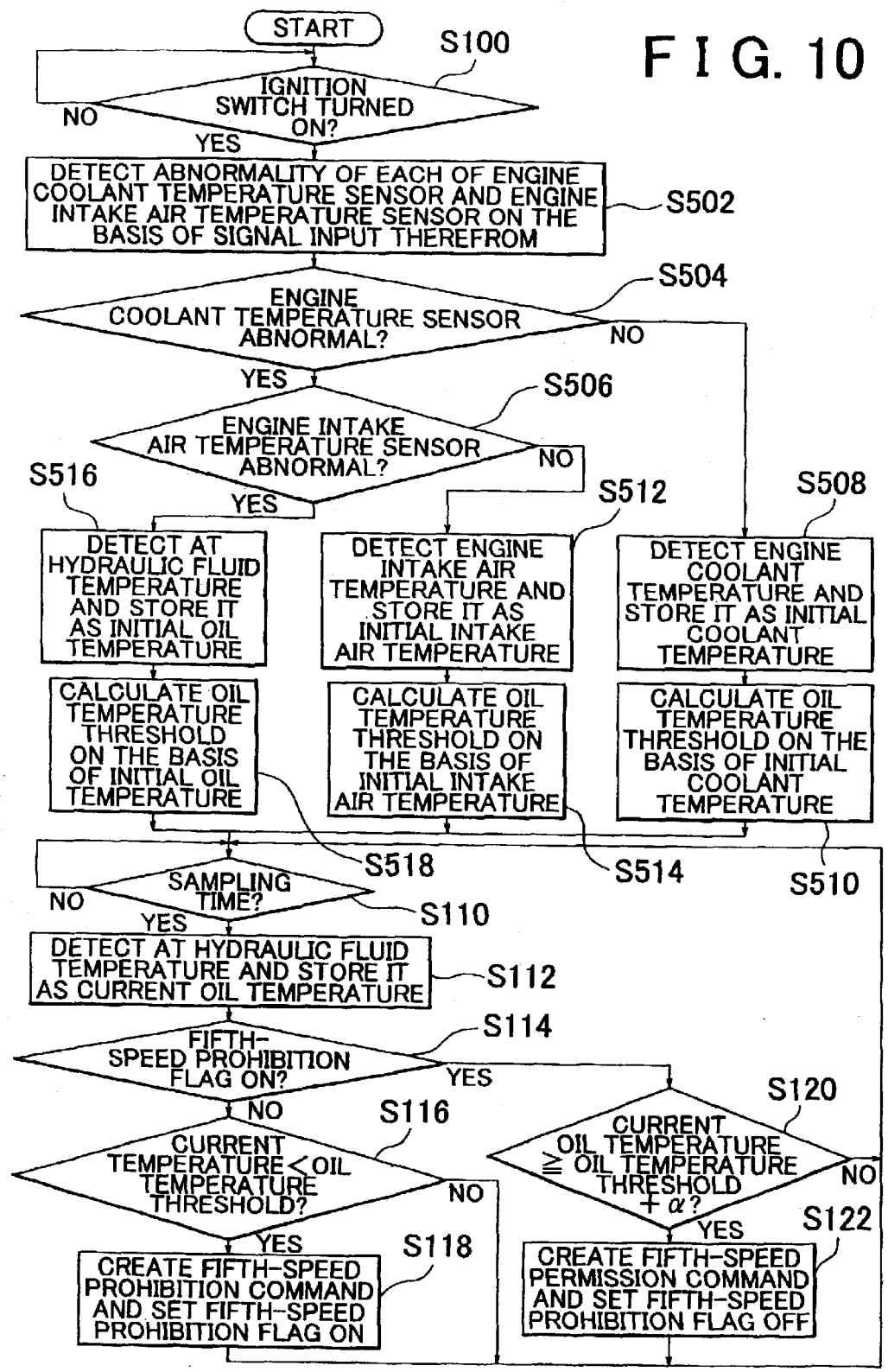
FIG. 10 is a flowchart showing a control structure of a program that is executed by an ECT-ECU in accordance with the fifth embodiment of the invention.

The processings in S516 to S518 in the fifth embodiment shown in FIG. 10 are not indispensable. It is appropriate to calculate an engine stop time and to calculate an oil temperature threshold on the basis of the engine stop time instead of performing the processings in S516 to S518. It is also appropriate to calculate an engine stop time and to calculate an oil temperature threshold on the basis of the engine stop time in addition to performing the processings in S516 to S518.

The embodiments disclosed herein are examples in all respects and should not be construed in any limitative sense. The scope of the invention is defined not by the foregoing description but by the claims and is intended to cover all modifications that are equivalent in significance and scope to the claims.

What is claimed is:

1. A control device for an automatic transmission installed in a vehicle, comprising:
   a detecting portion that detects a timing when an engine of the vehicle is to be started;
   an oil temperature detecting portion that detects a temperature of hydraulic fluid contained in the automatic transmission;
   a storing portion that stores a relationship between the temperature of the hydraulic fluid at engine start and an oil temperature threshold;
   a calculating portion that calculates the oil temperature threshold corresponding to the hydraulic fluid temperature detected by the oil temperature detecting portion at the timing detected by the detecting portion on the basis of the relationship stored in the storing portion; and a control portion that controls the automatic transmission to prohibit a gear shift to a specific gear stage if the hydraulic fluid temperature detected by the oil temperature detecting portion is equal to or lower than the oil temperature threshold calculated by the calculating portion while the vehicle is running.

2. The control device according to claim 1, wherein the detecting portion detects the timing when the engine is to be started on the basis of operation of an ignition key of the vehicle.

3. The control device according to claim 1, wherein
the oil temperature detecting portion includes two or more sensors for detecting the temperature of hydraulic fluid contained in the automatic transmission, a portion for detecting an abnormality of each of the sensors, and a portion for selecting the hydraulic fluid temperature detected by one of the sensors that has been detected to be normal as a hydraulic fluid temperature.

4. The control device according to claim 1, wherein
the gear shift to the specific gear stage is made by engaging a clutch by a direct pressure in a state where another clutch is engaged.

5. A control method for an automatic transmission installed in a vehicle, comprising:
a detecting step for detecting a timing when an engine of the vehicle is to be started;
an oil temperature detecting step for detecting a temperature of hydraulic fluid contained in the automatic transmission;
a preparing step for preparing in advance a relationship between the temperature of the hydraulic fluid at engine start and an oil temperature threshold;
a calculating step for calculating the oil temperature threshold corresponding to the hydraulic fluid temperature detected by the oil temperature detecting step at the timing detected in the detecting step on the basis of the prepared relationship; and
a control step for controlling the automatic transmission to prohibit a gear shift to a specific gear stage if the hydraulic fluid temperature detected in the oil temperature detecting step is equal to or lower than the oil temperature threshold calculated in the calculating step while the vehicle is running.

6. The control method according to claim 5, wherein
the detecting step including a step of detecting, on the basis operation of an ignition key of the vehicle, the timing when the engine is started.

7. The control method according to claim 5, wherein
the oil temperature detecting step includes a step of detecting abnormality of two or more sensors for detecting the temperature of hydraulic fluid contained in the automatic transmission and a step of selecting the hydraulic fluid temperature detected by one of sensors that has been detected to be normal as a hydraulic fluid temperature.

8. The control method according to claim 5, wherein
the gear shift to the specific gear stage is made by engaging a clutch by a direct pressure in a state where another clutch is engaged.

* * * * *